United States Patent
Liang

(10) Patent No.: US 8,025,757 B1
(45) Date of Patent: Sep. 27, 2011

(54) METHOD FOR MANUFACTURING TUBE MESH BAG

(76) Inventor: Hsiehyueh Wang Liang, Castro Valley, CA (US)

( * ) Notice: Subject to any disclaimer, the term of this patent is extended or adjusted under 35 U.S.C. 154(b) by 0 days.

(21) Appl. No.: 12/930,723

(22) Filed: Jan. 15, 2011

Related U.S. Application Data

(62) Division of application No. 11/893,196, filed on Aug. 15, 2007, now Pat. No. 7,931,064.

(51) Int. Cl.
*B32B 37/00* (2006.01)
(52) U.S. Cl. .................................... 156/322; 156/82
(58) Field of Classification Search .............. 156/82, 156/322, 497, 499, 547, 555, 578, 580, 582; 428/35.7, 36.1, 36.2, 107, 131, 200; 383/105, 383/117
See application file for complete search history.

(56) References Cited

U.S. PATENT DOCUMENTS

| 5,823,683 A | * | 10/1998 | Antonacci et al. ............ 383/107 |
| 6,761,012 B2 | * | 7/2004 | Rusert et al. .................... 53/410 |
| 7,931,064 B2 | * | 4/2011 | Liang ............................ 156/499 |

* cited by examiner

*Primary Examiner* — James Sells
(74) *Attorney, Agent, or Firm* — Dahyee Law Group; Leon E. Jew

(57) ABSTRACT

The invention teaches a new way to make mesh bags using adhesive labels and continuous mesh tubing. Using adhesive labels on continuous mesh tubing is made possible by guiding the mesh tubing both on the outside of the tubing and the inside of the tubing so that an adhesive label does not stick to the mesh surface on the other side of the mesh tubing. As a result the invention also teaches a new type of mesh bag made with this process and a new machine used for making mesh bags.

7 Claims, 10 Drawing Sheets

METHOD FOR MANUFACTURING TUBE MESH BAG

REFERENCE TO RELATED APPLICATION

This application is a divisional application of, and claims the benefit of priority to, U.S. patent application Ser. No. 11/893,196, filed on Aug. 15, 2007, now U.S. Pat. No. 7,931,064 the content of which is incorporated in its entirety by reference herein. The applicant certifies that there is no new matter included in this divisional application.

BACKGROUND OF THE INVENTION

1. Technical Field of the Invention

The present invention generally relates to the field of designing and manufacturing of packaging bags such as woven or mesh bags for containing onions, potatoes, citrus, nuts, fruits, or other produce. More particularly, the invention is related to a tube mesh bag coupled with pre-printed labels and the apparatus and method for manufacturing the same.

2. Description of the Related Art

Mesh bags have been widely used in commercial packaging and storing, laundry, as well as sports. More particularly, light weight and heavy duty mesh bags are widely used for packaging and storing fruits, nuts, onions, garlic, and etc. As with other containers of consumer products, labeling is needed to give notice of the brand of the product as well as to convey relevant information. The prior art's solutions for labeling are inferior to the present invention because they are lacking either in visibility, cost effectiveness, or aesthetics.

Prior art labeling methods on tube mesh included stitching the preprinted label on or tying it on. These methods are aesthetically lacking and/or are easily torn off or damaged in transport since they are only attached at one or two edges of the label.

Adhesive pre-printed labels are an aesthetic improvement since the label is entirely bonded to the mesh bag and does not have portions of the label hanging off the bag or unbounded edges such as the stitched or tied prior art labels. Thus, this type of label is superior to the prior art methods of labeling tube mesh bags.

Traditionally these adhesive pre-printed labels were used only on bags made from sheets of mesh. The sheet of mesh would then need to be sealed on two sides to create an open bag and three sides to form a closed bag. On the other hand, mesh tube could be sealed on one side to form an open bag and 2 sides to be sealed for a closed bag resulting in lower production costs. If the self adhesive heat activated preprinted labels could be used with tube mesh, then a mesh bag can be made with all the advantages of using adhesive labels, along with the lower costs of using tube mesh.

But, the machines which applied these labels must be used on sheets of mesh. Tube mesh could not be used with these machines because when they press the label onto the tube mesh, the other side of the tube mesh would also stick to the adhesive label, rendering the mesh unusable as a bag. Thus, a machine which can efficiently place these adhesive labels on tube mesh is desired.

The prior art in FIG. 1 shows a tube mesh bag 10 with a label 14 attached to a twist tie instead of on the bag itself. The label attached is small and thus is not very visible. Though the produce 11 inside the bag can be seen, the brand of the product would not be recognizable from a distance. Further the tag is attached to the bag by a twist tie 13 and could be easily torn off. Though this method may be cost effective, it is lacking in visibility and aesthetics.

The prior art in FIG. 2 shows a tube mesh bag with a label 221 222 tied to the bag at both ends using twist ties 23 24. This method allows the use of a larger label since it is held on at both sides. It is cost effective since the label is just tied on at the same time as the twist ties are secured. But the label is aesthetically lacking.

The prior art in FIG. 3 shows a tube mesh bag 30 which is stitched together at the bottom 34 and has a label 32 stitched at the top 31. This method is improved from the previously shown prior art in aesthetics and visibility, but it makes the package larger than necessary and can get wrinkled or bent easily during transport of the product.

The prior art in FIG. 4 shows a mesh bag which was made from a sheet of mesh 50 using adhesive labels 51. The adhesive labels are aesthetically superior to the other prior art labels and their size allows them to be easily read. They also do not increase the size of the package nor get damaged easily during transport the way the prior art shown in FIG. 3 does. These labels are primarily used on bags made from sheets of mesh rather than tube mesh since directly pressing the label onto a section of tube mesh would cause the other side of the tube stick to the label as well. But since sheets of mesh were used with this type of label, two sides of the mesh must be sealed 52 53 to form an open bag 54. A closed bag would require 3 sides to be sealed. Each set of seals results in added cost to the production of the bag.

What is desired is a tube mesh bag to which a pre-printed label is coupled using a dynamic guiding system to prevent the adhesive materials from being attached to the other side of the mesh tube.

SUMMARY OF THE INVENTION

The present invention teaches an apparatus and method for manufacturing tube mesh bags. The apparatus includes a dynamic guiding system used for coupling pre-printed labels to mesh tube. In one preferred embodiment, the guiding system includes at least two supporting rollers with a smooth surface and a guiding assembly. The guiding assembly includes at least two supported rollers with a smooth surface. The guiding assembly is placed in the middle of an outer chassis portion and is suspended by the supporting rollers attached to the outer frame. When the guiding assembly is placed in the apparatus, it is secured in place within the frame while allowing the continuous tube mesh to pass over the guide. The supported rollers are rested on the supporting rollers. When the supporting rollers move downward, the supported rollers move downward accordingly. The guiding assembly passes through the inside of the continuous mesh tube. Typically, the supporting roller is a driving roller. In operation, the mesh tube and the pre-printed label go between the supporting and supported rollers. The supported roller, i.e. the driven roller, asserts an appropriate pressure on the mesh tube, the pre-printed label and the supporting roller, such that the driving roller's motion causes a synchronized motion of the mesh tube, the pre-printed label and the supported rollers. In the manufacture processing, a roll of tube mesh is run through the apparatus and labeled at appropriate intervals. The tube is cut and sewn or heat sealed accordingly later in the bag making process.

In another preferred embodiment of the invention, the apparatus includes a device for supplying fluid adhesive between the pre-printed label and the mesh tube. After the pre-printed label and the mesh tube go through the rollers, the pre-printed label is firmly coupled to the mesh tube. In operation, the fluid adhesive is applied between the label and the mesh tube immediately before they merge between the supporting rollers on the frame of the apparatus and the supported rollers of the guiding assembly. When the label and the mesh tube merge and go through the rollers, they are pressed by the rollers because of the gravity of the guiding assembly, and after they pass through the rollers, the label is firmly coupled to the mesh tube. The continuous mesh tube is then cut at a designated length into sections. These sections are then sealed or closed at the open ends to form bags.

In another preferred embodiment of the invention, the apparatus includes a device for heating a self adhesive heat-activated label. The heating device is located just slightly above the supporting roller. This device applies heat to the self-adhesive heat activated label just before it is pressed on to the tube mesh. When the label and the mesh tube go through the supporting rollers on the frame of the apparatus and the supported rollers on the guiding assembly, the label is simultaneously heated and pressed, and after they pass through the rollers, the label is firmly coupled to the mesh tube. The continuous mesh tube is then cut at a designated length into sections. These sections are then sealed or closed at the open ends to form bags.

A bag made in this manner minimizes the number of sides which must be sealed to form a bag while allowing the advantages of using self adhesive heat activated labels.

DETAILED DESCRIPTION OF THE INVENTION

The present invention teaches a machine and method for manufacturing tube mesh bags. The machine includes a dynamic guiding system used for coupling pre-printed labels to mesh tube. Typically, the guiding system includes at least two supporting rollers with a smooth surface and a guiding assembly. The guiding assembly includes at least two supported rollers with a smooth surface. The guiding assembly is placed in the middle of an outer chassis portion and is suspended by the frame mounted supporting rollers. When the guiding assembly is placed in the apparatus, it is secured in place within the frame while allowing the continuous tube mesh to pass over the guide. The guiding assembly mounted supported rollers engage the frame mounted supporting rollers which in turn vertically support the guiding assembly. When the frame mounted supporting rollers move, the guiding assembly mounted supported rollers move accordingly. The guiding assembly passes through the inside of the continuous mesh tube. Typically, the frame mounted supporting roller is a powered roller. Glue and/or heat is applied to the label or the mesh tube for bonding the two together. Then the mesh tube and the pre-printed label go between the supporting and supported rollers. The supported roller, i.e. the powered roller, asserts an appropriate pressure on the mesh tube, the pre-printed label and the frame mounted supporting roller, such that the driving roller's motion causes a synchronized motion of the mesh tube, the pre-printed label and the guiding assembly mounted supported rollers. In the manufacture process, a roll of tube mesh is run through the apparatus and labeled at appropriate intervals. The tube is cut and sewn or heat sealed accordingly later in the bag making process.

The method according to the invention involves passing the continuous tube mesh through guides supporting the inside surface and the outer surface of the continuous mesh tube. Heat is applied to a self adhesive heat activated preprinted label or the continuous mesh tube using an adhesive application device. The label is applied by using engaged rollers on the inside and outside of the continuous mesh tube which press the label and mesh bag together. In one embodiment of this invention the continuous mesh tube is cooled after the label is applied.

Figure 1:
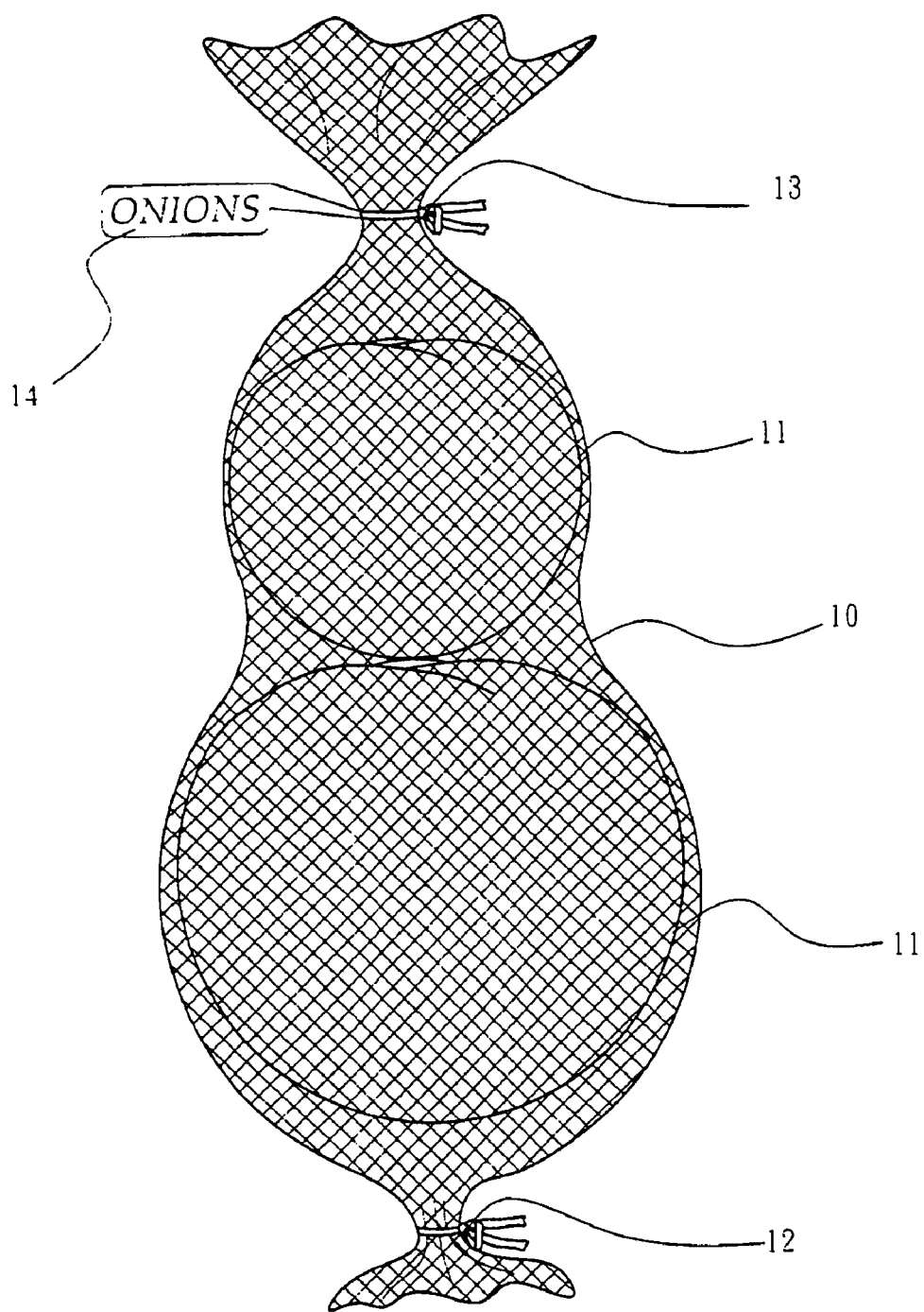
FIG. 1 is a schematic diagram of a mesh bag made according to the prior art which is not stitched and has a label attached to a twist tie instead of on the bag itself.
Figure 2:
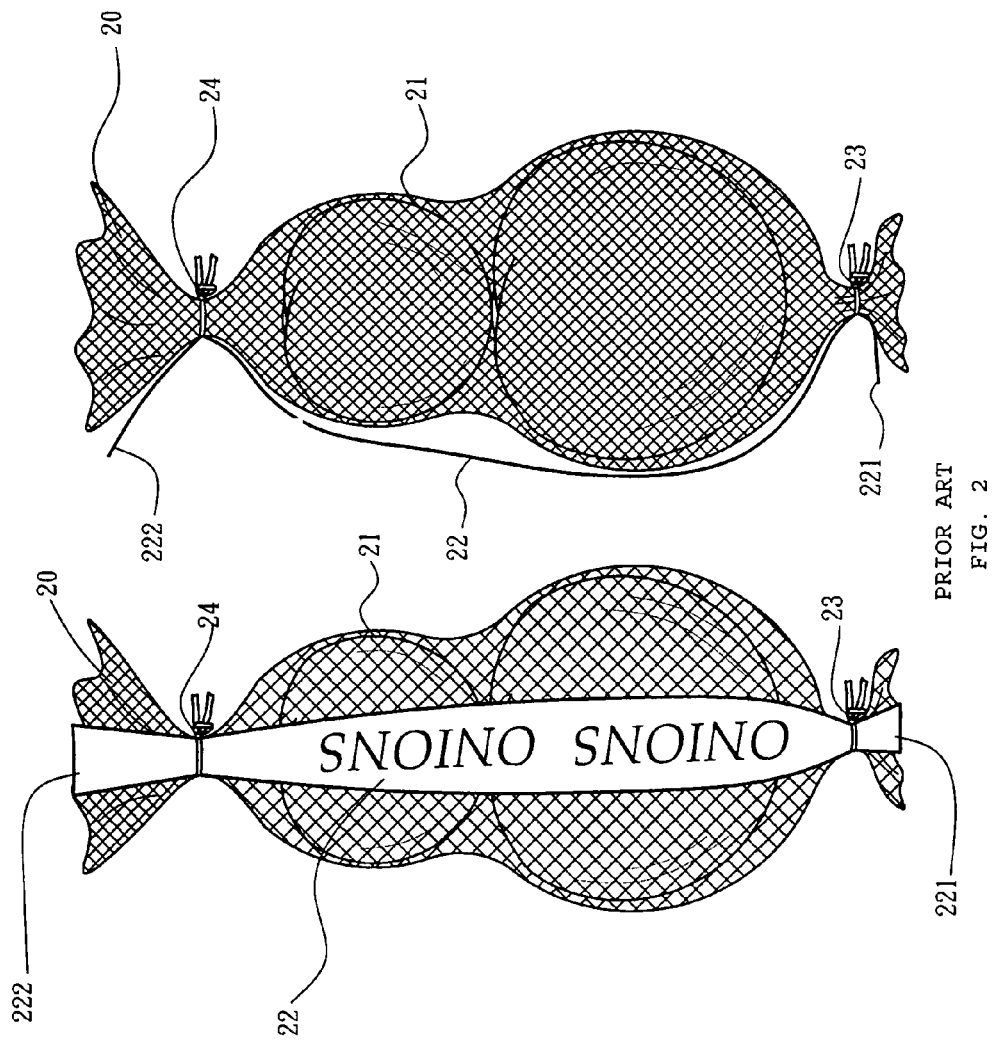
FIG. 2 is a schematic diagram of a mesh bag made according to another prior art which has its label tied on using twist ties at both ends of the bag.
Figure 3:
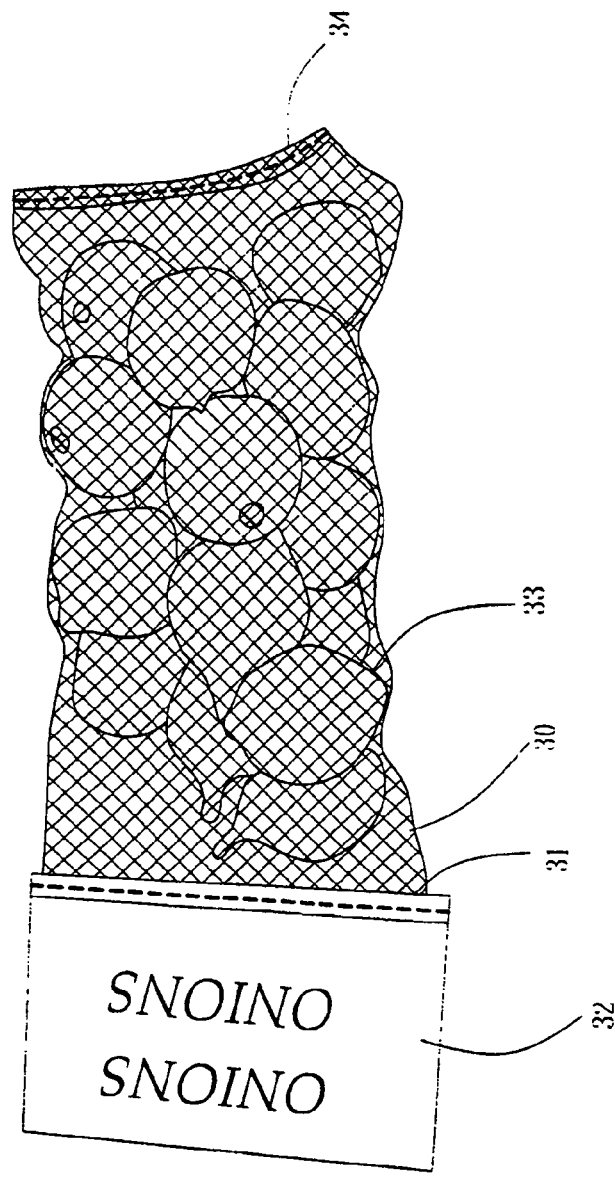
FIG. 3 is a schematic diagram of a mesh bag made according to a prior art which has the label stitched on one end of the bag.
Figure 4:
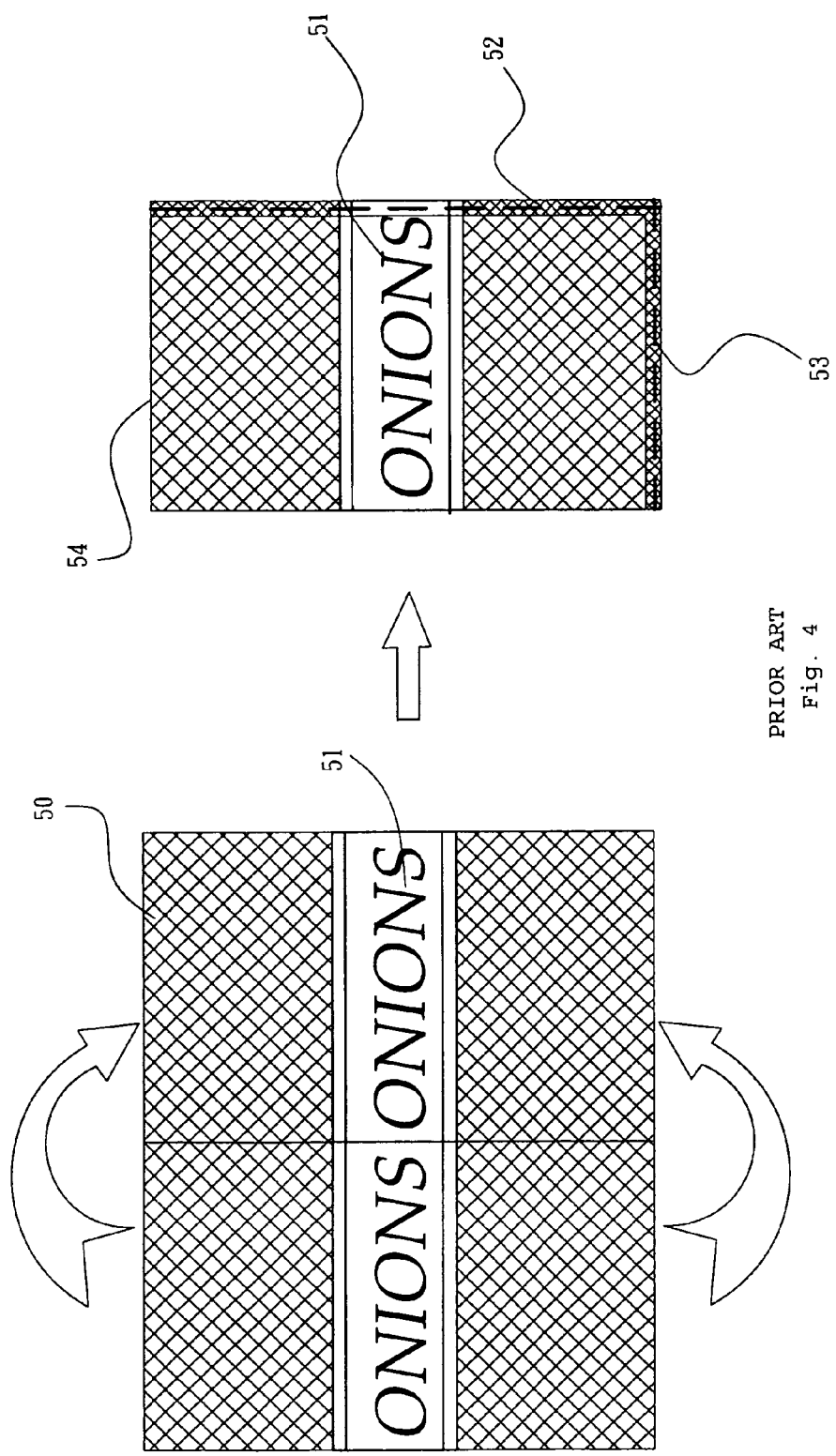
FIG. 4 is a schematic diagram of a mesh bag made according to a prior art using an adhesive label which must be applied on a sheet of mesh, where the sheet of mesh must be stitched together on two sides to form a mesh bag.
Figure 5:
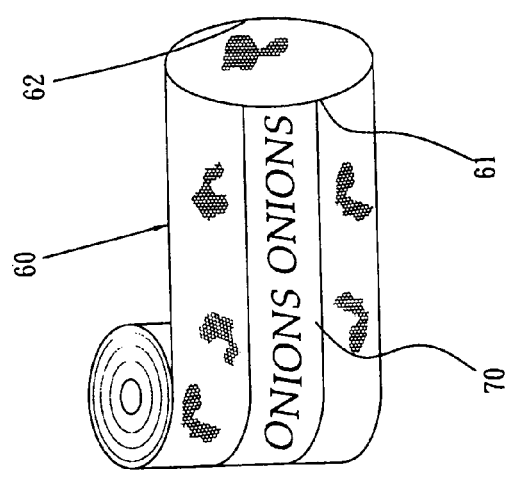
FIG. 5 is a schematic diagram illustrating that spools of labels are added to the spool of continuous mesh tubing to create labeled mesh tubing which is made by the present invention.
Figure 5:
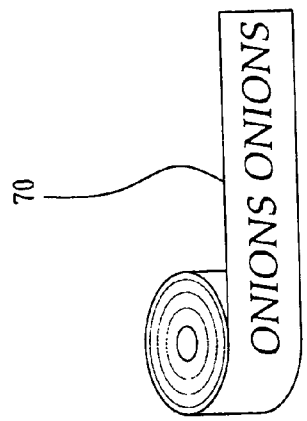
Figure 5:
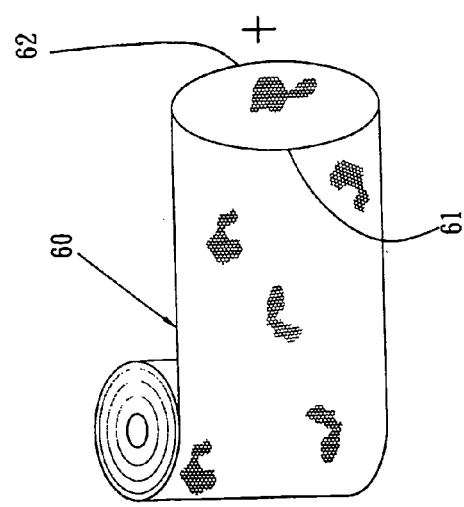

FIG. 5 is a schematic diagram illustrating that spools of labels are added to the spool of continuous mesh tubing to create labeled mesh tubing as made by the present invention. Spools of continuous tube mesh 60 are pressed together with a spool containing adhesive preprinted labels 70. The adhesive preprinted label is pressed on the designated label side 61 of the tube mesh while the opposite side of the tube mesh 62 does not come in contact with the adhesive label during the label application process.

Figure 6:
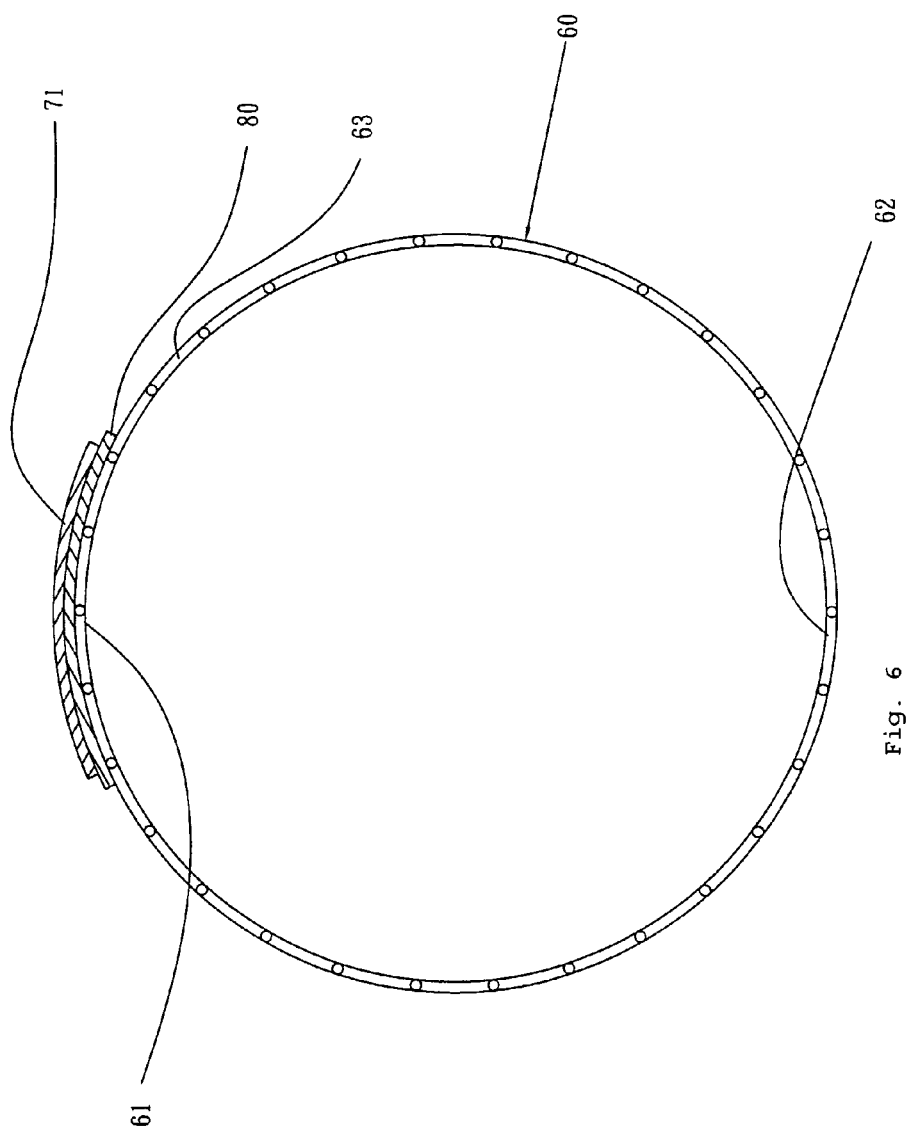
FIG. 6 is a schematic diagram of a cross section of tube mesh after the application of a label.

FIG. 6 is a schematic diagram of a cross section of tube mesh after the application of a label using the present invention. The diagram illustrates that the label 71 is placed onto the designated label side 61 of the mesh tube 60 using an adhesive layer 80 in between. Since the mesh tube is not solid and has large perforations, the opposite side 62 of the tube mesh will stick to the adhesive layer 80 if pressed on directly by prior art adhesive label application machines.

Figure 10:
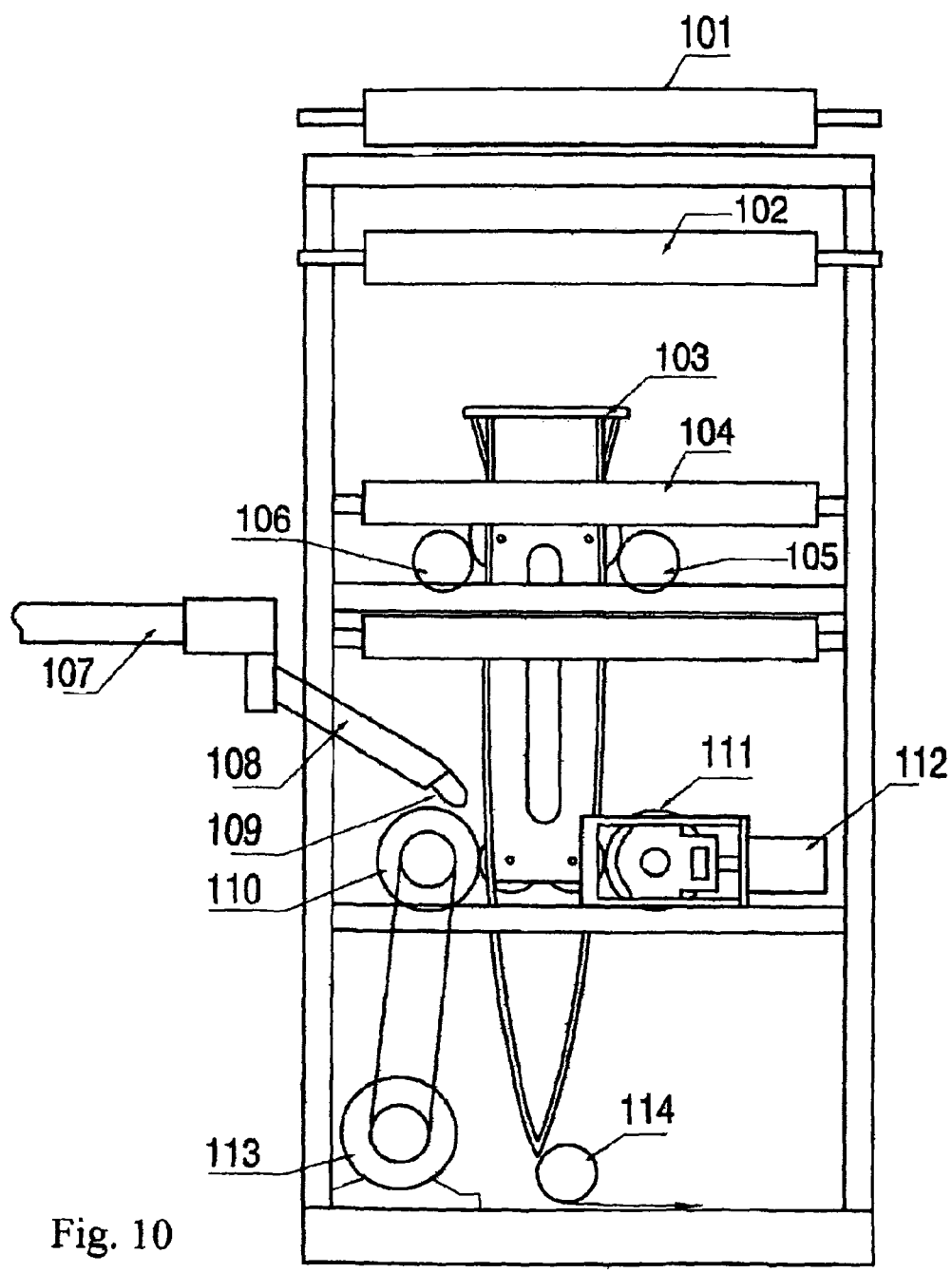
FIG. 10 is a schematic diagram of the apparatus used to apply adhesive labels on to tube mesh according a typical embodiment of the present invention.

FIG. 10 shows a schematic diagram of the apparatus used to apply adhesive preprinted labels on to tube mesh according a typical embodiment of the present invention. The frame portion of the machine is made from rigid materials such as metal, plastic, concrete, wood, or other materials which can support the weight of the structure and the mechanical loads it is subjected to. The machine's components are all mounted to the frame directly or indirectly. The frame contains a side free spinning roller 102 on the top side of the structure. The purpose of this roller is to guide the continuous tube mesh towards the top of the machine without having the tube mesh interfere or come in contact with other machine parts while the mesh is being routed upwards. The roller is free spinning and is made from rigid materials such as metal and plastic and is mounted to the frame using ball bearings in the typical embodiment. Another embodiment uses slotted rollers to prevent lateral movement between coupled rollers. In another embodiment, slotted rollers can be used to prevent lateral movement between coupled rollers. Wheels, balls, a conveyor belt, or even a smooth surface can also be used instead of rollers. A down feeding free spinning roller 101 on top of the machine frame is placed near the middle of the top portion of the frame. The purpose of this roller is to guide the continuous tube mesh downwards toward the guiding assembly 103. The roller is free spinning and is made from rigid materials such as metal and plastic and is mounted to the frame using ball bearings in the typical embodiment. Another embodiment uses wheels, balls, a conveyor belt, or even a smooth surface. The continuous tube mesh passes over the inner guide 103 so that the guide supports the inside surface of the tube mesh. In the typical embodiment, the guide is made of any reasonably solid material such as rubber, metal, plastic, wood. The guide's shape is smooth so the tube mesh can pass over it easily without getting caught. An overall round or spheroid shape is typical. The embodiment displayed in this figure is a round hoop leading into a flat rectangular body on the portion where the label is pressed on. Another embodiment of the guiding assembly allows for adjustability of the width of the guide so that different width continuous mesh tubes may be labeled with the machine. The width is adjusted using hinged panels, slotted sections, inserts, sliding sections, or similar methods. Two vertical support rollers 105 106 mounted on the frame supports the guiding assembly vertically and in two directions horizontally, but does not support the guide in the two horizontal directions perpendicular to the supported perpendicular directions. The roller is free spinning and is made from rigid materials such as metal and plastic and is mounted to the frame using ball bearings in the typical embodiment. In another embodiment, slotted rollers can be used to prevent lateral movement between coupled rollers. Wheels, balls, or other rotating objects can also be used instead of rollers. The vertical support rollers engage rollers mounted on the guiding assembly so the tube mesh can pass over the guiding assembly without being damaged. In a typical embodiment, the surface of the vertical support rollers, wheels, or balls is covered with rubber or some type of soft material to prevent the tube mesh from being damaged. Horizontal support rollers 104 are mounted perpendicular to the vertical support rollers. These rollers are used to support the guiding assembly in the two horizontal directions perpendicular to the horizontal directions supported by the vertical support rollers. They do not need to be placed snugly against the guiding assembly since movement of the guide in these two directions is acceptable to a degree. A reasonably sized gap would allow the continuous tube mesh to pass over the guide more easily as well. The horizontal support roller is free spinning and is made from rigid materials such as metal and plastic and is mounted to the frame using ball bearings in the typical embodiment. Another embodiment uses wheels, balls, a conveyor belt, or even a smooth surface. The label applicator roller 110 is a motor driven roller 113. A typical embodiment of the roller uses a hard material such as metal or plastic. A typical embodiment of the motor used for the label applicator is an electric motor. Other embodiments of the motor are internal combustion engines using gasoline, propane, methanol, natural gas, or other combustible fuel. Another embodiment of the label applicator uses a mechanical press instead of a roller. A typical embodiment of the label applicator has a clearance and pressure adjustment on the label applicator. The label application roller is engaged against a free spinning roller placed on the guiding assembly. On the opposite side of the label application roller is the feeder roller 111 which is also motor driven 113. The feeder roller is engaged with another roller mounted on the guiding assembly. The feeder roller turns at the same speed as the label application roller and feeds the continuous tube mesh evenly through the machine. The placement of the feeder roller is such that there is proper clearance between the guiding assembly and the label application roller so adequate pressure can be exerted to press the self adhesive heat activated label on to the tube mesh. The feeder roller in this embodiment is adjustable horizontally so fine adjustments can be made to the pressure with which the label is pressed on to the mesh bags. The adjustment also allows different types and sizes of continuous mesh tube to be used in the same machine. In one embodiment, the horizontal adjustment is made with electric motors 112 so the adjustment can be made quickly and easily. Another embodiment uses hand turned levers to make the adjustment. Another embodiment uses screws, bolts, nuts, hex bolts, or other fasteners to secure the feeder roller. In another embodiment, the feeder roller and the label application roller, when engaged with the free spinning rollers on the guiding assembly, support the entire guiding assembly vertically by themselves. In other words, there is no need for a second set of rollers for support or suspension of the guiding assembly in this embodiment. The guiding assembly is given vertical stability by adding weights to the bottom of the guiding assembly. The amount of weight added also determines the pressure which the preprinted labels are to be applied. For stability, the weights are mounted a significant distance below the horizontal plane on which the label application roller and feeding roller are placed. The weights mounted with appropriate increments are attached to the guiding assembly using a method which would make weight adjustments quickly. Some embodiments of the weight change system include using a metal rod with holes, weights having a hole slightly larger than the rod, and a pin which would be placed through the holes in the rod to secure the weights. Another embodiment of the weight attachment system could use hooks on the guiding assembly for attaching weights. An inertial damper could be placed in the guiding assembly to increase stability by reducing swaying motions in the guiding assembly which may result during operation. Adhesive is applied with a nozzle 108 placed over the label application roller used for bonding the preprinted labels to the tube mesh. The nozzle is made of metal, plastic, epoxy, or any rigid material. A control system may be used to regulate the flow of adhesive. The typical embodiment also has a nozzle attachment 109 which distributes the adhesive to the entire label evenly. A typical embodiment of the nozzle attachment would be rectangular and approximately the width of the label to be applied. In another embodiment, heated air flow is used to activate self adhesive heat activated labels. The heated air is delivered by a nozzle 108 placed over the label application roller. The nozzle is made of metal, plastic, epoxy, or other heat resistant material. A typical embodiment of the nozzle and duct transporting the heated air has heat insulation such as fiberglass or other insulating material. The typical embodiment of the present invention has a temperature control system 107 which controls the temperature and flow of the heated air. A typical embodiment of the invention has a nozzle attachment 109 which distributes the heated air to the entire self adhesive heat activated label evenly. An embodiment of this nozzle attachment is rectangular in shape and approximately the width of the label to be applied. Another embodiment of the present invention uses a heating element without airflow. Cooling airflow can be used on the mesh tube after the label is applied to cure the adhesive label. In one embodiment of this invention the continuous mesh tube is cooled by a fan shortly after the label is applied. In another embodiment, an air duct or array of air ducts is used to cool the mesh tube shortly after the label has been applied. The exit roller 114 of the machine guides the continuous mesh tube away from the present invention to another stage in the mesh bag making process. The other stages include cutting the mesh tube into sections, sealing an open end of the tube section, placing the product into the bag, and then sealing or closing the other end of the bag.

In another embodiment, the guiding assembly can be oriented horizontally using at least three supported rollers on the guiding assembly coupled to two supporting rollers on the frame. Two supported rollers are placed on the same horizontal plane on the guiding assembly and are coupled to the powered label application roller from the front and back with the third supported rollers on the guiding assembly coupled to a supporting roller located on the same horizontal plane as the powered label application roller. The two supported rollers on the guiding assembly can be coupled to a supporting roller mounted to the frame while at least one supported roller on the guiding assembly is coupled to a supporting roller mounted to the frame.

In another embodiment, the invention can be used to open the uncut tube mesh for placing contents inside. The opened tube mesh would be filled before it is sealed and cut. This method allows the tube mesh to be sealed at both ends, trapping the contents to be packaged in the middle, before the finished package it is cut away from the rest of the tube mesh. This is an improvement on the prior art method since it would dramatically simplify the packaging process. The prior art packaging method cuts the tube mesh and completes the mesh bag with one open end. The separated individual bags then must each be separately opened, filled, and then completely sealed on the last open side.

The current invention creates a packaging bag with a adhesive preprinted label placed on a section of tube mesh with the open ends of the tube mesh sealed or closed using heat sealing, sewn stitches, wire twist ties, drawstrings, bread tag clips, or pinch clips. An embodiment of a bag made with the present invention has handles sewn in on the stitch sealed side of the bag.

Another embodiment of a bag made with the present invention has one end of the tube mesh section sewn or heat sealed to a plastic or paper band with holes for use with a drawstring. Typically, a mesh bag is used for containing fruit, produce, and sports equipment. The mesh bag is made of soft, flexible materials with sufficient strength to hold produce, fruits, and other objects of similar weight. Another embodiment of the mesh bag has an unsealed opening at its first end for filling. The second end of the mesh bag is pre-sealed with a line of easy-open stitches sewn across the entire transverse length of the bag. The line of easy-open stitches, together with the enclosure, i.e., the mesh bag wall, forms a bottom of the mesh bag, i.e., a dead end, to avoid leakage. The second end of the mesh bag also includes a pre-set annular band or lace or a drawstring (herein after as the drawstring) perforating the mesh bag. After the mesh bag is filled, the unsealed opening is then sealed using a packaging machine with a sewing function or a thermal sealing function. While the mesh bag is being filled by a packaging machine, the opening is usually upward. However, the textual product information, labels, signs, graphics, and trademark are oriented downward or upside down in a typical embodiment. In another embodiment, the mesh bag is filled and sealed with a line of stitches. These stitches can be sewn in a manner which is easily opened by the user. When the user is to open the mesh bag, he does not need to cut the mesh bag as in the situation in the prior arts. Rather, he just needs to pull the line of easy-open stitches. The line of easy-open stitches will be easily removed when it is pulled by the user. This embodiment may also include a drawstring for re-closing the bag. After parts of the contents of the bag are taken from the mesh bag, the user may re-close it by pulling the drawstring and tying it up.

Figure 7:
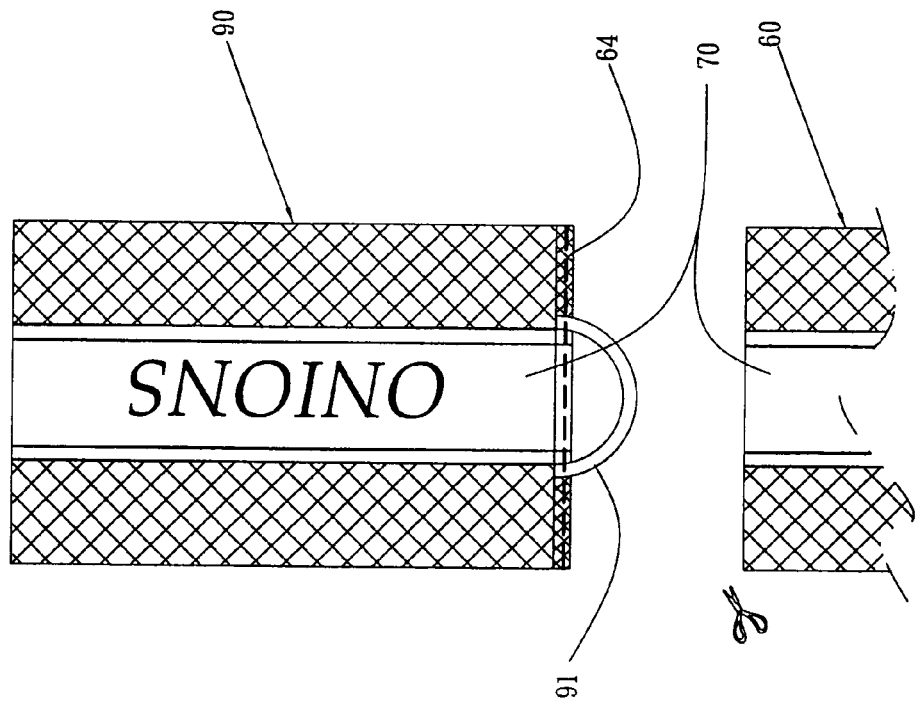
FIG. 7 is a schematic diagram of a mesh bag made using the present invention where the tube sections are cut at a designated length after the labeling process and stitched on one side to form a bag.

FIG. 7 is a schematic diagram of a mesh bag 90 made using the present invention where the tube sections are cut at a designated length after the labeling process and stitched 64 on one side to form a bag. The mesh bag 90 is cut from the spool of continuous mesh tubing 60. This example also includes handles stitched 64 on the bottom 91

Figure 8:
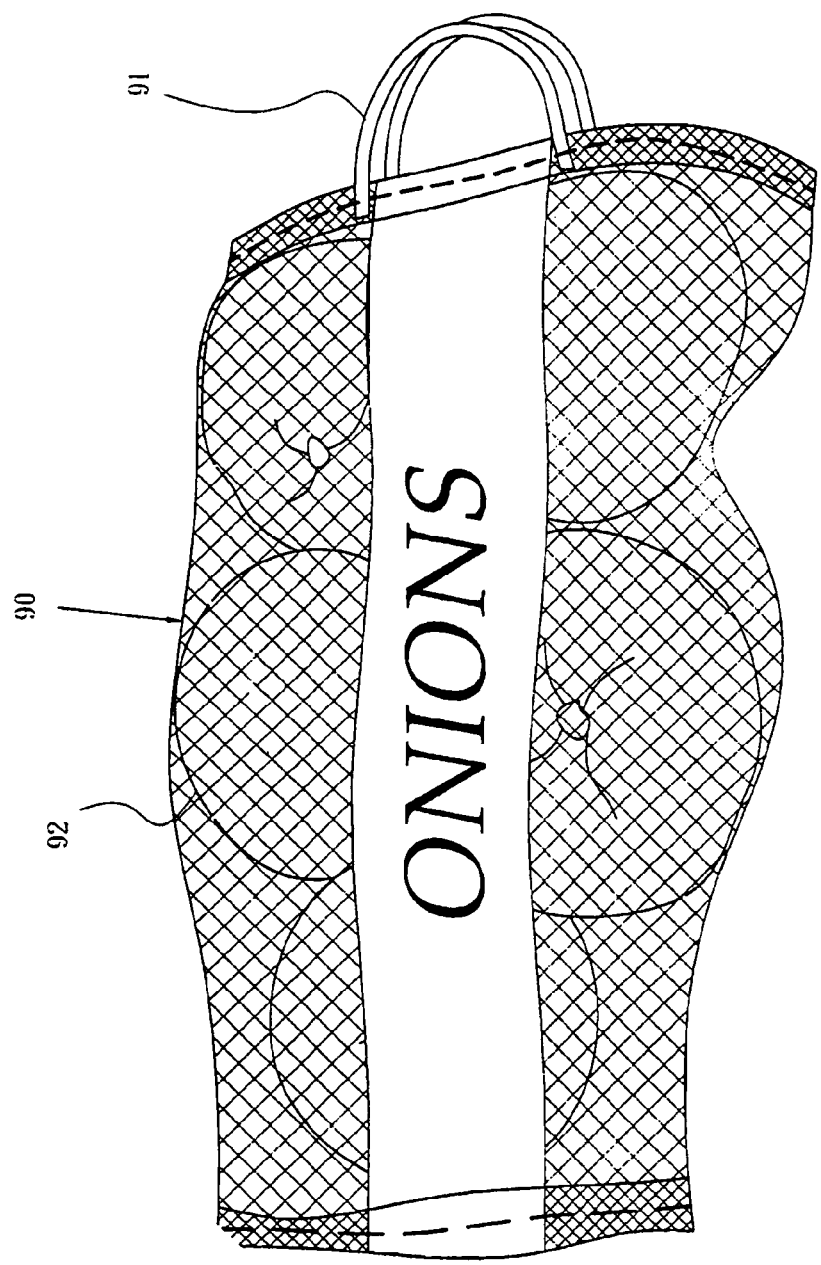
FIG. 8 is a schematic diagram of a completed mesh bag made using the present invention.

FIG. 8 is a schematic diagram of a completed mesh bag 90 made using the present invention. The tube mesh is stitched closed at both openings after the produce or such 92 is placed inside in this example. This example also has handles 91 sewn in.

Figure 9:
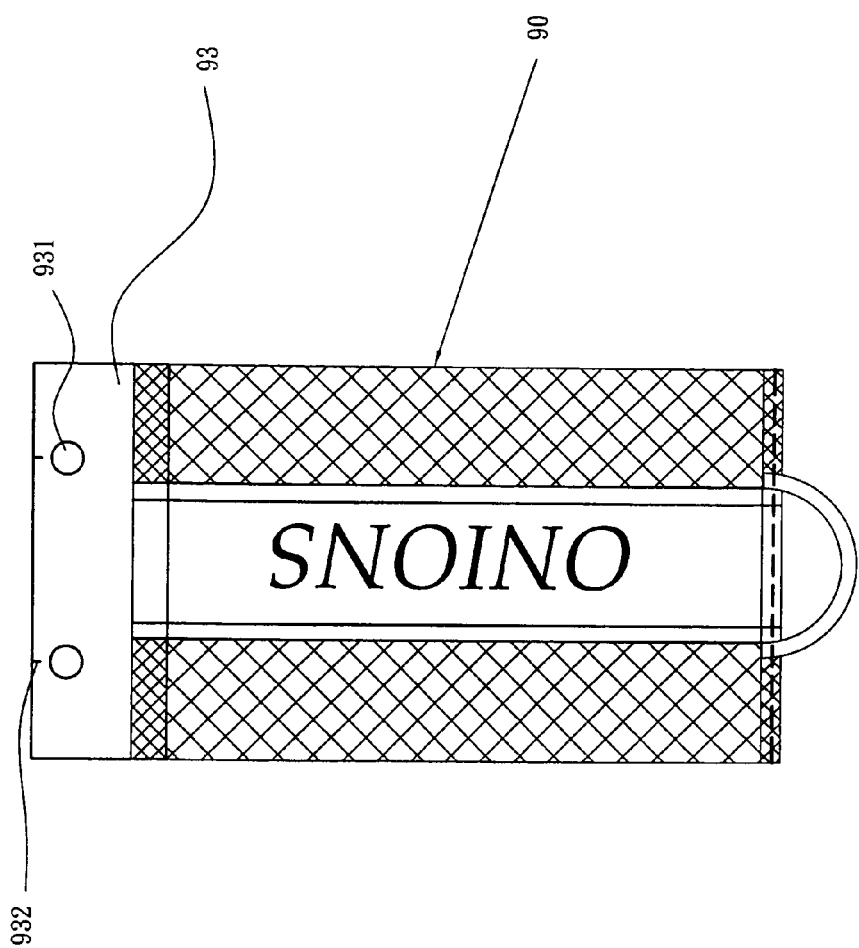
FIG. 9 is a schematic diagram of a completed mesh bag made using the method according to the present invention.

FIG. 9 is a schematic diagram of a completed mesh bag 90 made using the present invention. The tube mesh is heat sealed at one end to an open 932 non mesh portion 93 with holes for use with a drawstring 931 to close the opening. The other end of the bag is stitched closed.

While one or more embodiments of the present invention have been illustrated in detail, the skilled artisan will appreciate that modifications and adoptions to those embodiments may be made without departing from the scope and spirit of the present invention as set forth in the following claims.

The invention claimed is:

1. A method for coupling pre-printed labels to a continuous mesh tube comprising the steps of: transporting said continuous mesh tube through a powered roller, said powered roller being attached to a frame; and transporting said continuous mesh tube through a second powered roller, said second powered roller being attached to said frame on the same horizontal plane as said powered roller and is oriented parallel to said powered roller; transporting said continuous mesh tube using a guiding assembly located within said frame, said guiding assembly placed between said powered roller and said second powered roller; wherein said guiding assembly contains at least two free spinning guiding assembly support rollers located on the same horizontal plane and oriented parallel to each other, with at least one said guiding assembly support roller coupled to said powered roller and another said guiding assembly support roller coupled to said second powered roller; wherein said continuous mesh tube is transported by passing said guiding assembly through the inside wall of said continuous mesh tube through an open end of the said continuous mesh tube, and the tube wall of said continuous mesh tube passes between said support rollers and said powered roller and said second powered roller; wherein said guiding assembly is supported horizontally and vertically within said frame using at least two said guiding assembly support rollers coupled with at least two frame mounted support rollers or by coupling one said guiding assembly support roller to said powered roller and coupling another said guiding assembly support roller to said second powered roller; labeling said continuous mesh tube by inserting a band containing pre-printed labels between said powered roller and said mesh tube, and when said powered roller rotates, said band and said mesh tube passes between, and are pressed by said powered roller and said guide assembly support roller.

2. The method of claim 1, further comprising the step of: passing said continuous tube mesh over said guiding assembly with adjustable thickness to keep said continuous mesh tube taut when the label is applied.

3. The method of claim 1, further comprising the step of: transporting said continuous mesh tube such that the mesh tube moves over the guiding assembly by rotating said powered roller and said second powered roller in opposite directions such that said continuous mesh tube is pulled over said guiding assembly in a downwards direction.

4. The method of claim 1, further comprising the step of: applying adhesive using a device for supplying fluid adhesive between said band and said continuous mesh tube immediately before said band and said continuous mesh tube are pressed between said powered roller and said guiding assembly support roller.

5. The method of claim 1, further comprising the step of: heating said preprinted label using a device which supplies heated air flow to said preprinted label before the label is pressed between said powered roller and said guiding assembly support roller.

6. The method of claim 1, further comprising the step of: passing said continuous mesh tube through at least two said frame mounted support rollers and at least four said guiding assembly support rollers, with at least two said frame mounted support rollers located on the same horizontal plane in said frame and oriented parallel to each other, with said frame mounted support rollers coupled to at least two said guiding assembly support rollers such that the guiding assembly is supported vertically and horizontally in two directions; with at least two other said guiding assembly support rollers located on the same horizontal plane as said powered roller and said second powered roller, with one said guiding assembly support roller coupled to said powered roller and one said guiding assembly support roller coupled to said second powered roller.

7. The method of claim 6, further comprising the step of: pressing said continuous mesh tube and said preprinted label at the appropriate pressure by adjusting the positioning of said second powered roller or said powered roller using a lead screw and slider on each side of said powered roller or said second powered roller's axle to allow clearance adjustments for labeling said continuous mesh tubes of different types and thicknesses.

\* \* \* \* \*